(12) United States Patent
Zegg et al.

(10) Patent No.: US 7,163,622 B2
(45) Date of Patent: Jan. 16, 2007

(54) FILTER

(75) Inventors: Herbert Zegg, Gratwein (AT); Werner Erkinger, Graz (AT)

(73) Assignee: Andritz AG, Graz (AT)

( * ) Notice: Subject to any disclaimer, the term of this patent is extended or adjusted under 35 U.S.C. 154(b) by 140 days.

(21) Appl. No.: 10/332,720

(22) PCT Filed: Jun. 25, 2001

(86) PCT No.: PCT/EP01/07205

§ 371 (c)(1),
(2), (4) Date: Mar. 26, 2003

(87) PCT Pub. No.: WO02/07478

PCT Pub. Date: Jan. 24, 2002

(65) Prior Publication Data

US 2003/0155292 A1    Aug. 21, 2003

(30) Foreign Application Priority Data

Jul. 13, 2000    (AT) ............................... A 1220/2000

(51) Int. Cl.
*B01D 63/16* (2006.01)
*B01D 63/08* (2006.01)
*B01D 65/02* (2006.01)
*B01D 33/23* (2006.01)
*B01D 33/39* (2006.01)

(52) U.S. Cl. ............... 210/232; 210/331; 210/486; 210/321.64; 210/321.68

(58) Field of Classification Search ............ 210/321.64, 210/321.68, 780, 331, 232, 486
See application file for complete search history.

(56) References Cited

U.S. PATENT DOCUMENTS

| 1,264,635 A | * | 4/1918 | Graham | 210/331 |
| 2,038,921 A | * | 4/1936 | Blaufuss | 210/397 |
| 3,157,598 A | * | 11/1964 | Rebiscoul | 210/327 |
| 3,395,801 A | * | 8/1968 | Muller | 210/771 |
| 3,997,447 A | * | 12/1976 | Breton et al. | 210/360.2 |
| 4,120,911 A | * | 10/1978 | Davidson | 62/541 |
| 4,698,156 A | * | 10/1987 | Bumpers | 210/331 |

FOREIGN PATENT DOCUMENTS

| DE | 3814373 | * | 11/1989 |
| DE | 19502848 | * | 6/1995 |
| FR | 912116 | * | 6/1946 |
| FR | 1211614 | * | 3/1960 |
| JP | 02-102717 A | * | 4/1990 |
| JP | 05-358528 | * | 11/1992 |
| JP | 05-285352 | * | 2/1993 |
| JP | 06-099041 A | * | 4/1994 |
| JP | 06-121919 A | * | 5/1994 |
| JP | 06-218245 A | * | 8/1994 |
| JP | 07-075722 | * | 3/1995 |
| JP | 07-289861 A | * | 11/1995 |
| JP | 10-146521 A | * | 6/1998 |
| WO | 00/09239 | * | 2/2000 |

* cited by examiner

*Primary Examiner*—Thomas M. Lithgow
(74) *Attorney, Agent, or Firm*—Alix, Yale & Ristas, LLP

(57) ABSTRACT

The invention refers to a filter 1 with several rotating filter discs 3 mounted on a shaft 2 and which are provided with a porous filter medium. It is characterized by elastomer elements (8, 8') being mounted on the shaft (2) as spacers between the individual filter discs (3). In addition, the invention refers to a filter disc 3 for a filter 1 of this kind.

11 Claims, 6 Drawing Sheets

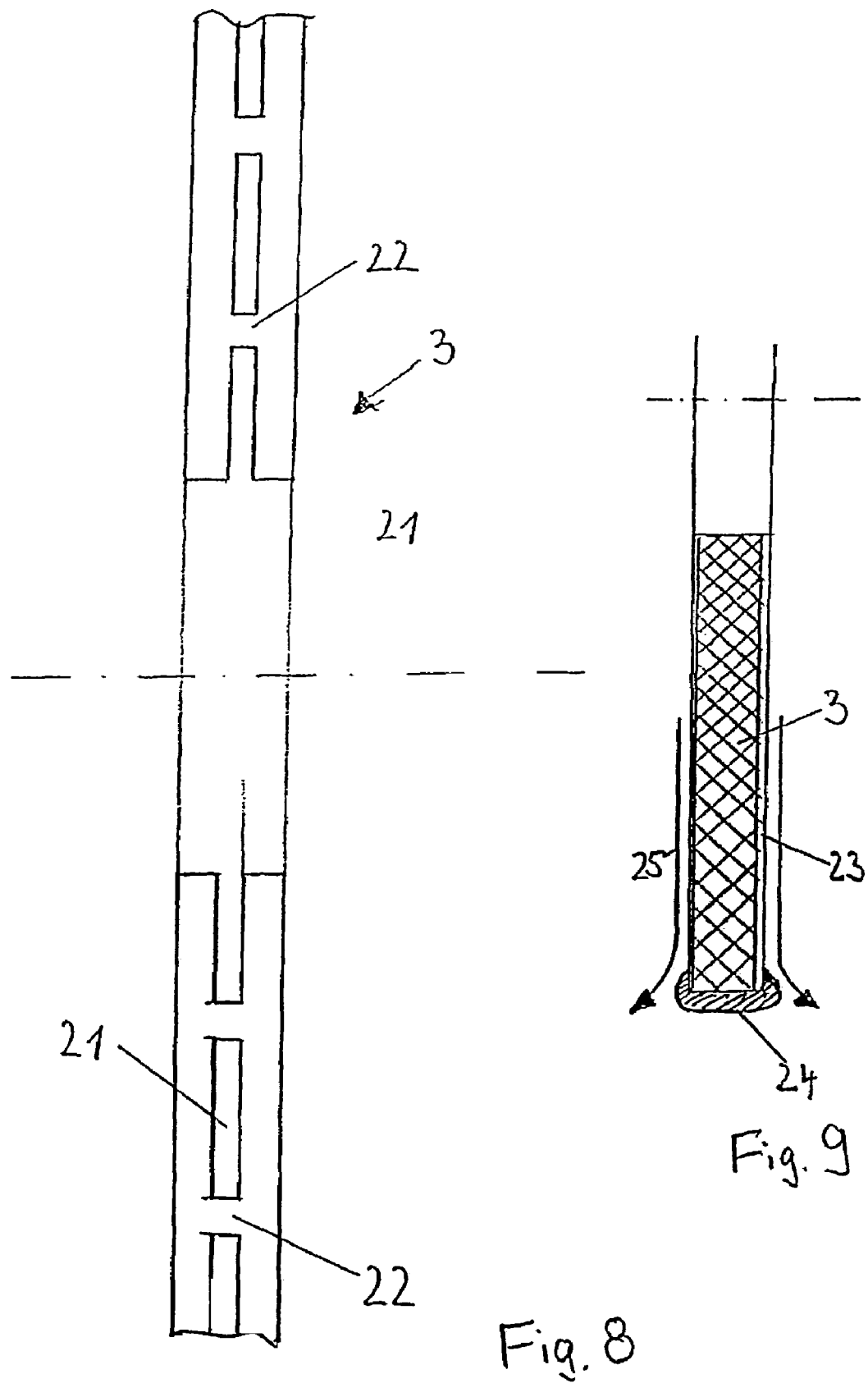

FILTER

Figure 1:
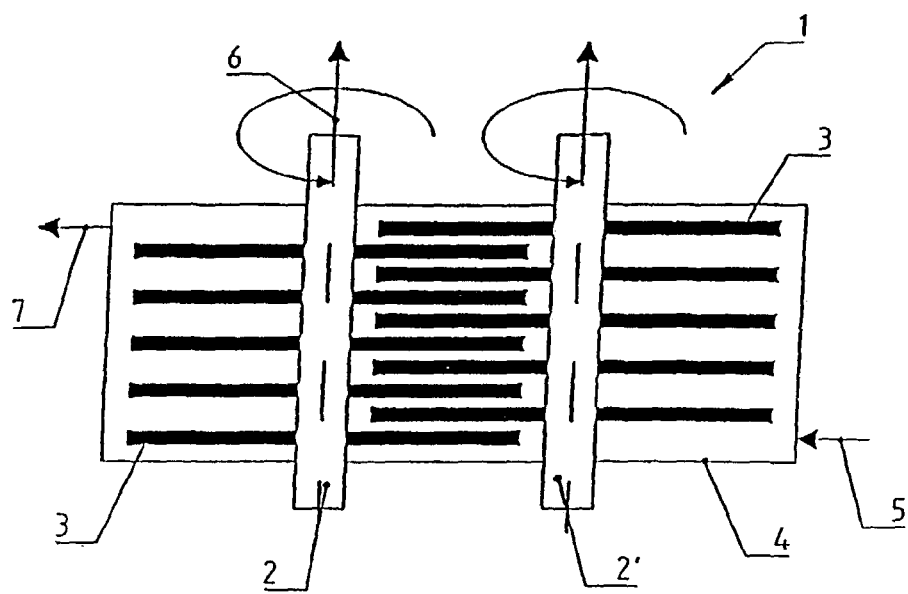

This application is a national filing of International application PCT/EP01/07205 filed Jun. 25, 2001, which claims priority under the Paris Convention of Austrian patent application number A1220/2000 filed 13 Jul. 2000.

The invention relates to a filter with several rotating filter discs mounted on a shaft and which are provided with a porous filter medium.

A filter of this kind is known from AT 406936 (AT-A 155/99). The problematical aspect here is the fact that a large number of filter discs are used here on one shaft, which is supposed to overlap with the filter discs of an additional shaft. In order to maintain flexibility in the choice of disc supporting element and be able to use ceramic elements, for example, a frictional connection is recommended between shaft and disc. A sealing element must form the frictional connection. These circumstances entail the following risks and problems.

The manufacturing tolerances (disc, shaft and spacers) and the influence of the compressibility of the sealing elements can accumulate, with the result that the desired disc spacing can no longer be achieved. In extreme cases there may be damage due to the discs coming into direct contact with each other.

During start-up procedures in particular, there may be slippage due to the inertia of the filter disc mass if the frictional connection is inadequate. This leads to intensive wear on the sealing elements.

The aim of the invention is to permit reliable operations with a simple filter manufacturing process.

The invention is thus characterised by elastomer elements being mounted on the shaft as spacers between the individual filter discs. Since elastomer elements are used as sealing material between the individual filter discs and the centre core, there is no need for a positive-locking torque transfer between the discs and the centre cores.

An advantageous further development of the invention is characterised by the elastomer elements being manufactured in one piece. This permits manufacture at more reasonable cost, particularly if the spacing between the filter discs is narrow.

A favourable alternative further development of the invention is characterised by several elastomer spacers being provided, interspersed with metal spacers. Better stability is achieved if these metal bushes are inserted, particularly if there is substantial spacing between the filter discs.

An advantageous configuration of the invention is characterised by several filter discs and elastomer elements being pre-loaded together in axial direction, where 5 to 20, preferably 10 to 15 filter discs can be clamped together. Since the filter discs and elastomer elements are pre-loaded, this provides a simple seal between filter disc and centre core and a good means of setting the spacing between the filter discs, while compensating any tolerances in the disc thickness arising during manufacture, compressibility of the sealing elements, etc. Since several filter discs can be pre-loaded together, any lack of uniformity can be compensated over a short stretch in each case and the problem of uneven spacing arising when all filter elements are linked from one side only is eliminated.

A favourable further development of the invention is characterised by several shafts with filter elements being arranged on one level and driven all together, by a belt for example. If the filter elements are arranged horizontally, for example, all shafts mounted consecutively can be driven all together with only one drive, with the filter discs rotating in opposite directions in the overlap area, thus improving turbulence on the surface and providing a better cleaning effect.

An advantageous configuration of the invention is characterised by several levels of shafts with filter discs being provided, where these levels are separated from one other by dividing walls with suitable openings mounted in a shared housing. In this way, several pressure stages can be implemented in addition within one housing, with the housing also being stabilised thanks to the dividing walls. Furthermore, a suitable flow pattern can be applied to avoid short-circuit flow.

An advantageous further development of the invention is characterised by internal mountings being provided which are adapted to the contours of the filter discs and which reduce the hollow space in the housing. Due to these mountings, which extend into the wedges between the filter discs, the free inner volume and the idle space are substantially reduced, which is a considerable advantage, particularly when increasing the concentration of the solids suspension in batch operations.

A favourable configuration of the invention is characterised by a filtrate receiver being located at one end of the shafts and into which all centre cores discharge, preferably also of pressure-resistant design. If this type of receiver is used, there is no need for the rotary transmission leadthrough otherwise needed between centre core and pipe and which takes up a great deal of space. Due to the pressure-resistant design it is possible to apply overpressure for backwashing, as well as underpressure, to increase the trans-membrane pressure.

Another favourable further development of the invention is characterised by the raw medium being fed in at a tangent to the filter discs. Good cross-flow filtration is achieved with this flow control, without disturbing filtration on the discs near the inlet and also avoiding disc abrasion.

An advantageous configuration of the invention is characterised by the shafts supporting the filter discs being speed-adjustable. In this way the turbulence between the filter discs can be adapted accordingly to the given requirements, particularly with changing medium composition or substantial differences in concentration, without having to change the entire flow-through path and/or the filtrate pressure.

An advantageous further development of the invention is characterised by a device being provided to run the filter up and down slowly at start-up and shutdown, where a motor with frequency converter or a turbo-coupling can be provided. As a result any slippage of the filter discs can be avoided at start-up and shutdown. This is a particular advantage with the friction connection due to the axial pre-loading with elastomer rings.

A further configuration of the invention is a filter disc for a filter according to the invention, characterised by a retaining body being provided with a filter medium (wire, felt, foil membrane or similar) mounted on it. Thus a suitable base frame with a correspondingly low-cost membrane foil can be provided to suit each filter application.

A favourable further development of the invention is characterised by the retaining body being made of perforated plate, sintered metal, ceramic, or porous synthetic material.

An advantageous configuration of the invention is characterised by the foil membrane being of ceramic or polymer material.

A further development of the invention is characterised by the filter medium being a wire, made by weaving synthetic or metal wires, or a screen, made by drilling holes in a plastic foil or a metal plate.

An advantageous further development of the invention is characterised by the foil membrane being welded or glued to the retaining body. As a result, suitable filter discs can be manufactured at low cost.

A favourable configuration of the invention is characterised by a beaded edge being applied to the outer edge of the filter disc, made, for example, from elastic polymer material. This deflects the flow of the medium as it runs off the disc surface, thus avoiding disc abrasion.

A particularly favourable further development of the invention is characterised by the retaining body being cast, e.g. from ceramic material, where the drainage channels are created by a core inserted in the casting and which is eroded entirely by heat without leaving any residue behind. This method of manufacture permits simple and low-cost manufacture of the filter discs, where the one-piece filter disc type also yields much longer service life in comparison with the manufacturing methods in several layers as used to date.

In the following the invention is described in examples based on the drawings, where FIG. 1 shows a state of the art filter, FIG. 2 an illustration of the invention, FIG. 3 a further illustration of the invention, FIG. 4 a further representation of the invention, FIG. 5 an arrangement of the shafts, FIG. 6 a special design of the housing, FIG. 7 a view of the filter, FIG. 8 a filter disc according to the invention, FIG. 9 a sectional view of a filter disc design according to the invention, and FIG. 10 a further design of a filter disc according to the invention.

FIG. 1 shows a state of the art filtration module 1. Several membrane discs 3 are secured to each of the centre cores 2, 2'. The liquid/suspension to be filtered is fed into a tank 4 through a pipe 5. A closed tank 4 is shown here. The tank can also be open, in which case the membranes are submerged into the liquid. The membrane discs 3 have a cylindrical cross-section here. The filtrate passes through the membrane into the hollow disc body 3 and is guided to the centre of the disc as permeate and then through the centre core 2, 2' and through a pipe 6 out of the filter. The cleaned concentrate can be drained off later through a pipe 7. The membrane module 1 can be operated both with overpressure on the concentrate side and with underpressure on the permeate side. Correspondingly, the module 1 can be used as a closed casing or as submerged membranes. The overpressure can be as high as 10 to 14 bar.

The membrane discs 3 may comprise inorganic elements, as well as supporting elements with a filter medium (wire, felt, polymer membrane). The design is suitable for both chemical cleaning of the filter medium, e.g. membranes in operation, as well as for fully automatic permeate backwashing. The filtration modules 1 can be used for general filtration processes for removal of solids, for microfiltration (as from approximately 0.3 microns), ultra-filtration, nano-filtration (up to approximately 4000 Dalton) to reverse osmosis in drinking water treatment, process water treatment, municipal and industrial waste water treatment, as well as in product filtration, depending on the filter medium used.

Figure 2:
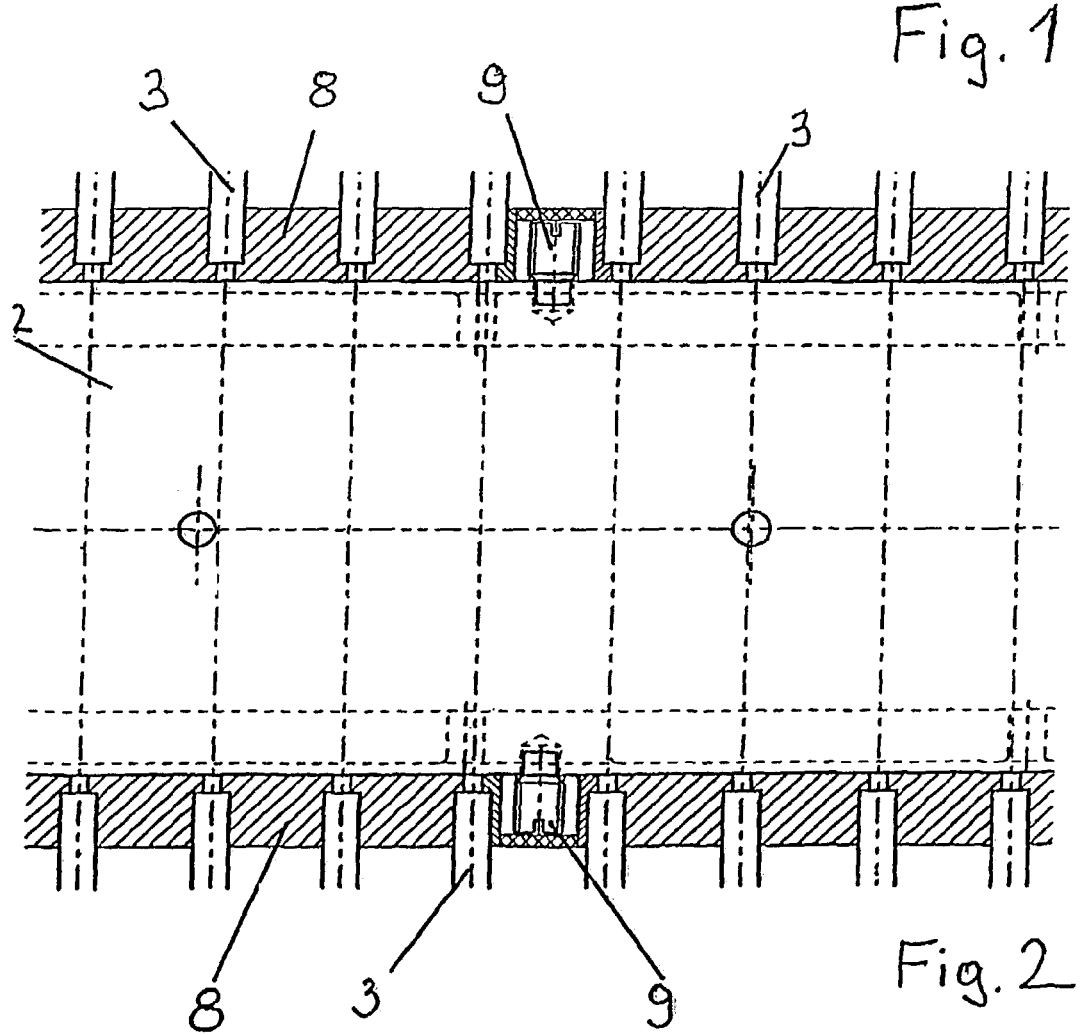

FIG. 2 provides a sectional view of a filter according to the invention, where only one shaft 2 is shown with the individual filter discs 3. Elastomer elements 8, which serve as spacers, are mounted on the centre core 2 between each of the individual filter discs 3. The present illustration shows one-piece elastomer elements 8 as used to maintain small spaces between the filter discs 3. This view also shows set collars with threaded pins 9, which are used to secure the filter discs 3 and elastomer elements 8 on the shaft 2.

Figure 3:
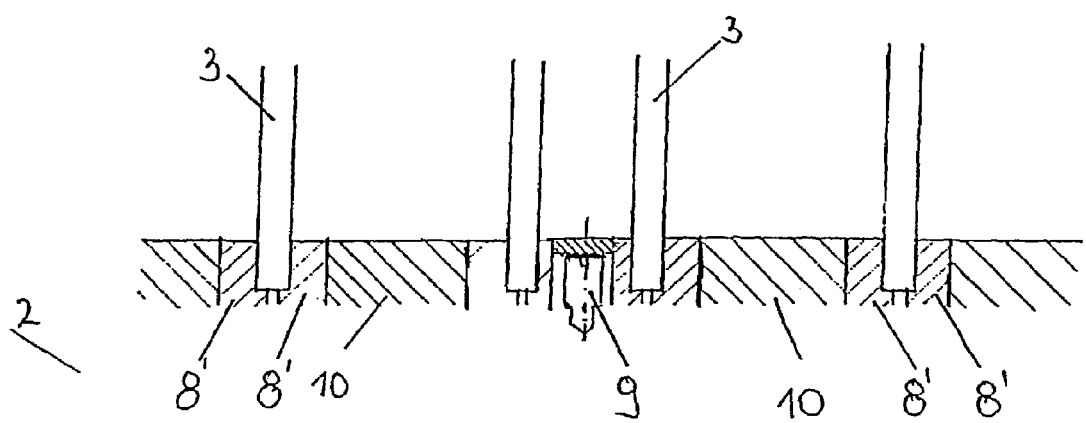

FIG. 3 shows a variant of the spacers, where an elastomer element 8' is provided at each filter disc 3. The wider space between the filter discs 3 is obtained by a spacer 10, made preferably of metal, being inserted between the corresponding elastomer elements 8'.

Figure 4:
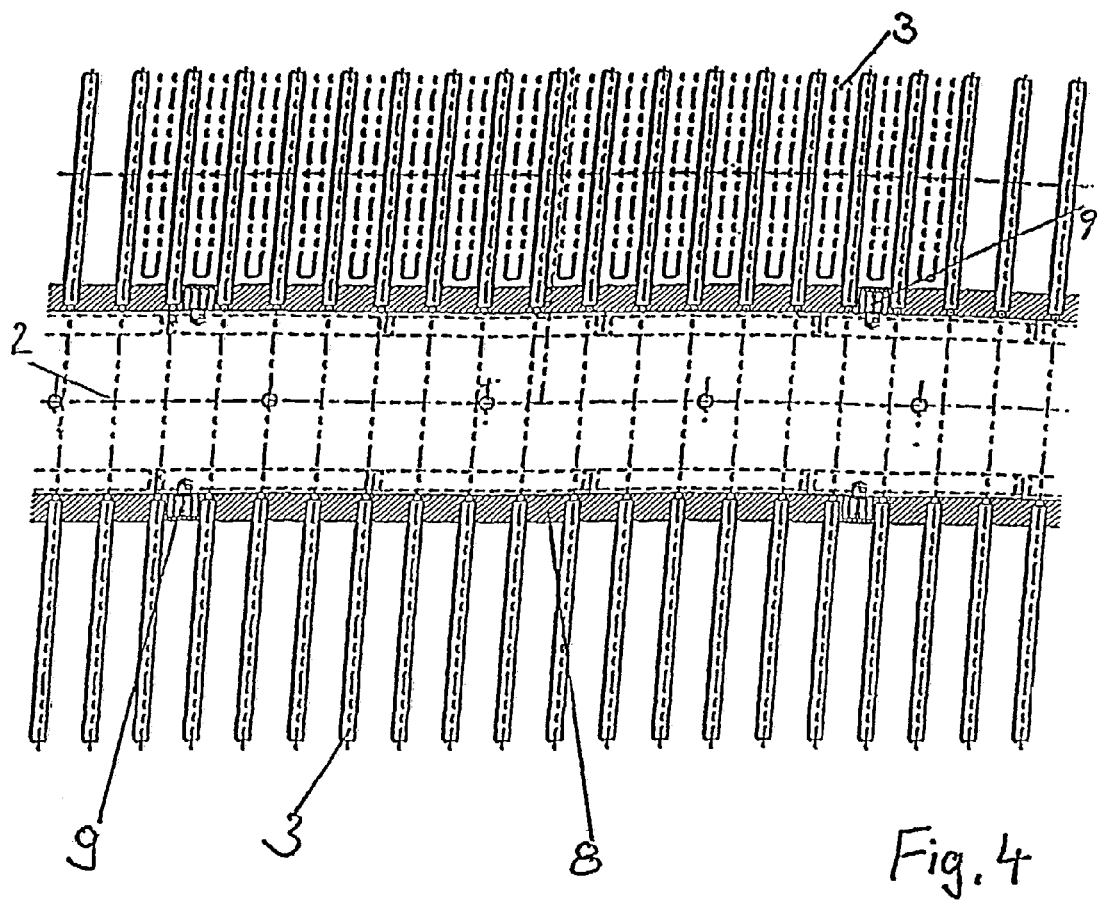

FIG. 4 shows the assembly of several filter discs 3 and elastomer elements 8, where set collars with threaded pins 9 are provided both at the beginning and the end of a module of this type and hold the modules, comprising filter discs 3 and elastomer elements 8, or also the elastomer elements 8' and metal spacers 10 between them, together under pre-load. As a result, it is easier to mount further modules and the filter discs 3 are positioned with appropriate precision. This is particularly important because the filter discs 3 of an additional shaft 2' should be positioned with more or less constant spacing and engage the spaces between the discs without contact. Due to the overlap thus achieved, turbulence is generated which provides effective cleaning of the surfaces of the filter disc 3.

Figures 5, 6:
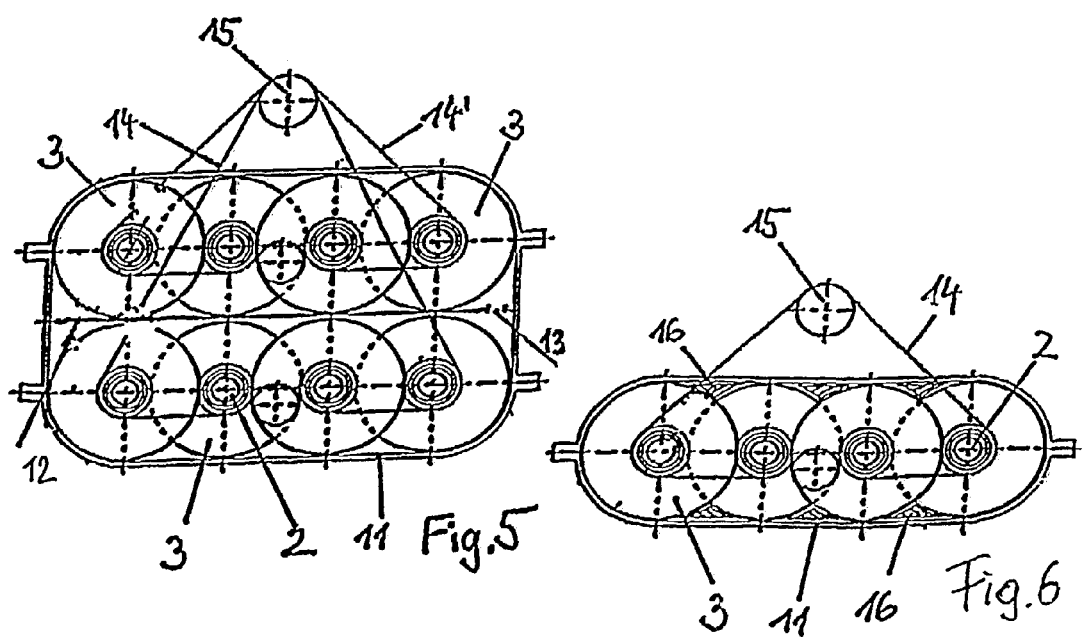

FIG. 5 shows a variant of the invention, where several shafts 2 with filter discs 3 are arranged horizontally adjacent to one another, with two such levels one above the other. As a basic principle, it would be possible to arrange several levels above one another. The levels are separated inside the casing 11 by a dividing wall 12 with an opening 13. As a result, different concentrate stages with different pressure ratios can be obtained for optimum efficiency with high concentrating effect in one casing. It is of advantage if the casing 11 is divided on the central axis of the shafts, which also facilitates assembly and disassembly of the shafts using a crane. With this arrangement, the shafts 2 can be driven jointly for one level using a belt 14, 14' with one single drive shaft 15. If the opening 13 in the dividing wall 12 is positioned in a suitable location in relation to the suspension inlet and outlet, short-circuit flow can be avoided. Thus, the desired output can also be achieved.

FIG. 6 shows a similar arrangement to FIG. 5, but with only one level of shafts 2. The additional internal mountings 16 to reduce the hollow space in the housing 11 are shown here, adapted to fit the contours of the filter discs 3 and secured to the walls of the casing. In principle it would also be feasible to adapt the outer shape of the casing to the contours of the filter discs, however this would make manufacture of the casing more complicated.

Figure 7:
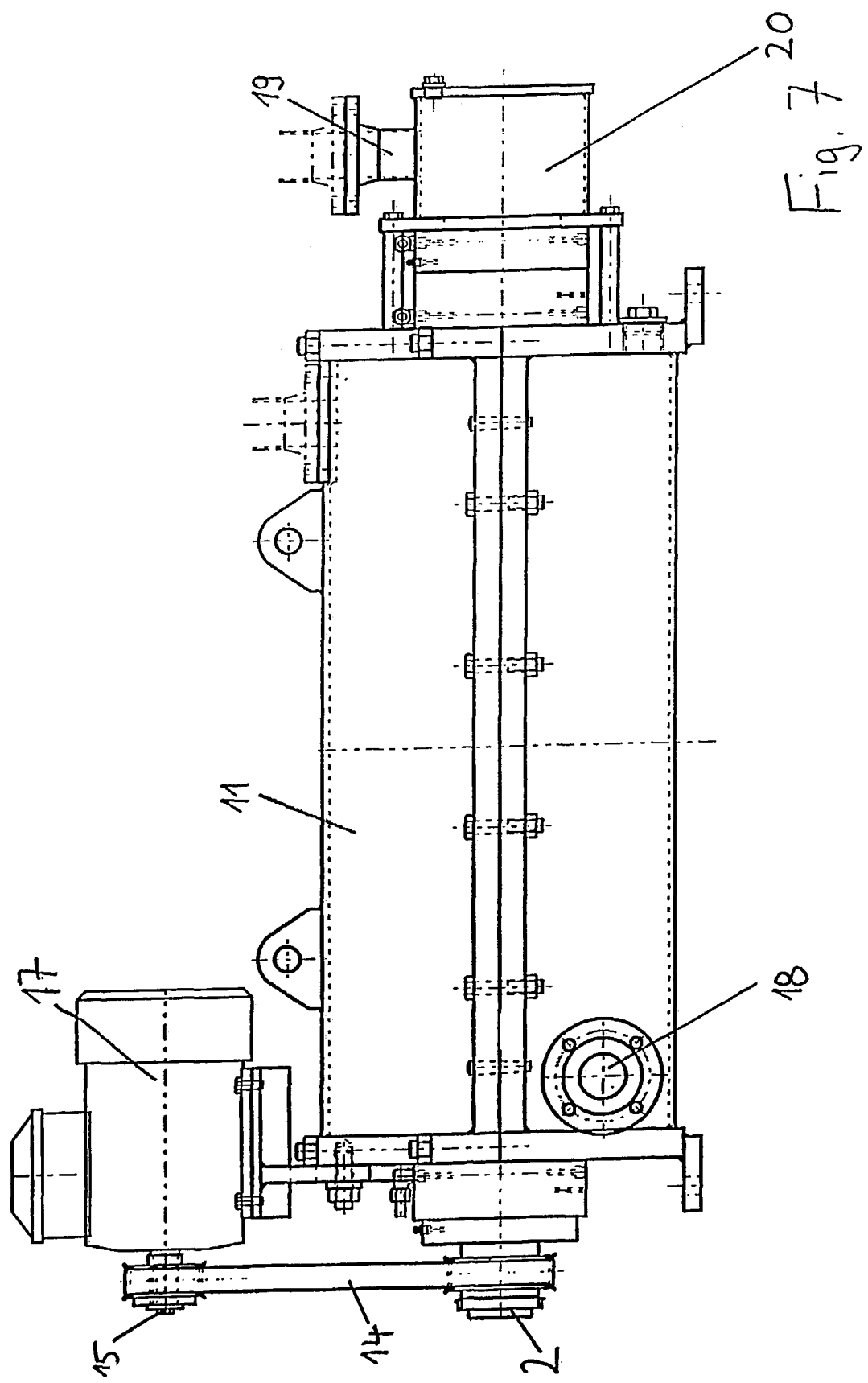

FIG. 7 shows an assembled filter 1 with casing 11 and drive 17 with drive shaft 15 and belt 14. In addition, the illustration shows the raw material feed 18 mounted at a tangent and the outlet 19. The horizontal centre cores 2 both discharge into a filtrate collecting tank 20. This filtrate collecting tank 20 is of pressure-resistant design, so that the suspension can also be fed in and discharged under pressure, which allows the filtration efficiency to be controlled by setting the counter-pressure. If a vacuum is used, the maximum filtrate throughputs are higher. Furthermore, filtrate can be used for backwashing if higher pressure is applied. This improves cleaning of the surfaces and extends the intervals between chemical cleaning processes.

A filter disc 3 according to the invention is shown in FIG. 8. The disc has channels 21 and bars 22 on its centre level, so that the liquid filtered out of the suspension (filtrate) can be transported as required and then discharged into the centre core.

A filter medium, e.g. a membrane foil 23, can be applied to the surface of the filter disc 3, as shown in FIG. 9. If the base frame 3 is made of ceramic material and the membrane foil 23 also, it is an advantage to sinter-fuse the two together. The filter medium, e.g. membrane, can also be attached by welding or gluing. In order to minimize abrasion on the disc, particularly in and around the outer edge, beading 24 made preferably of an elastic polymer material is applied if abrasive media are to be processed. This beading 24 alters the flow 25 of the medium as it runs off the filter disc 3 in such a way as to prevent abrasion.

Figure 10:
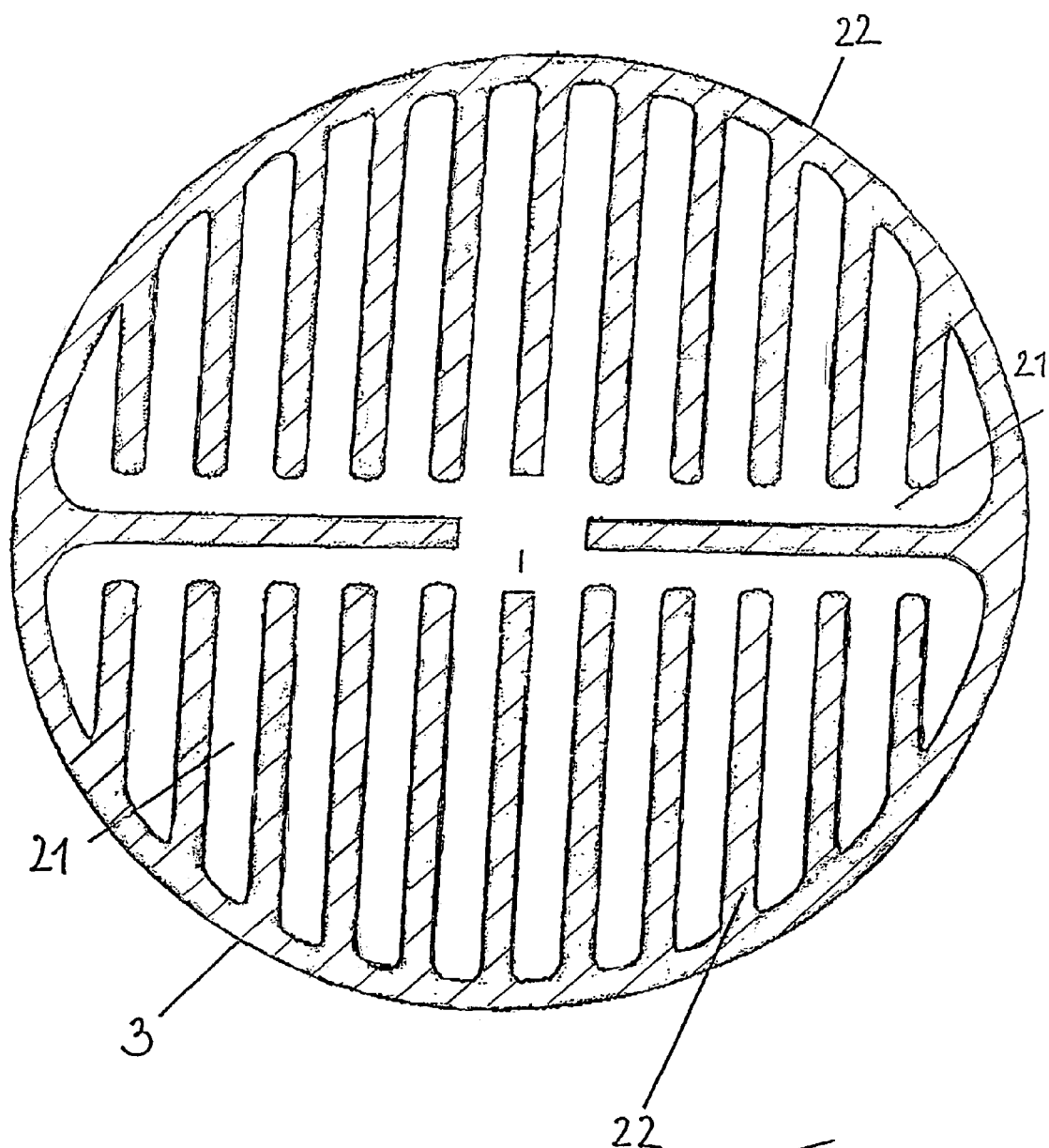

The filter disc 3 can be designed according to FIG. 10 at its middle level. This figure once again shows the channels 21 and bars 22. In order to obtain this shape in a casting process, the invention proposes that a core, e.g. made of wax or another organic material that burns without leaving any residue, be formed, which has the same shape as the channels and is inserted when the filter disc is cast. The future channels are then defined precisely by the shape of this core. The filter disc 3 is then burned and, during this process, the core burns away entirely leaving no residue, thus forming the channels. The shape of the channels as shown is only one possibility, however other shapes also allow favourable results. By using a core according to the invention it is also possible to create other advantageous channel shapes that could not be produced otherwise. The core used need not necessarily consist of one piece only, thus permitting further channel shapes.

The invention is not restricted by the configurations illustrated.

The invention claimed is:

1. Filter with a plurality of filter discs mounted in spaced succession on a rotatable shaft and which are provided with a porous filter medium, wherein the improvement comprises that
    a plurality of rotatable shafts with a respective plurality of filter discs are arranged laterally with the discs of laterally adjacent shafts overlapping, and elastomer elements are mounted on the shafts as spacers between the individual filter discs, whereby during rotation of the shafts the spacing between successive discs on a given shaft remains substantially unchanged;
    the shafts are driven all together, by a common driver; and
    several levels of said laterally arranged shafts with filter discs are provided, where these levels are separated from one other by dividing walls with openings mounted in a shared housing.

2. Filter according to claim 1, wherein the elastomer elements were each manufactured in one piece.

3. Filter according to claim 1, wherein several elastomer spacers are provided, interspersed with metal spacers.

4. Filter according to claim 1, wherein several filter discs and elastomer elements are pre-loaded together in the shaft axial direction.

5. Filter according to claim 4, wherein 5 to 20 pre-loaded filter discs are clamped together.

6. Filter according to claim 1, wherein internal mountings are provided which are adapted to the contours of the filter discs and which reduce the hollow space in the housing.

7. Filter according to claim 1, wherein the filtrate from the discs drains into a shaft center core and a filtrate receiver is located at one end of the shafts and into which all center cores discharge.

8. Filter according to claim 1, wherein raw medium to be filtered is fed in at a tangent to the filter discs.

9. Filter with a plurality of filter discs mounted in spaced succession on a rotatable shaft and which are provided with a porous filter medium, wherein the improvement comprises that
    a plurality of rotatable shafts with a respective plurality of filter discs are arranged laterally with the discs of laterally adjacent shafts overlapping, and elastomer elements are mounted on the shafts as spacers between the individual filter discs, whereby during rotation of the shafts the spacing between successive discs on a given shaft remains substantially unchanged; and
    the shafts supporting the filter discs are speed-adjustable by a motor with frequency converter.

10. Filter according to claim 9, wherein a device is provided to run the filter rotation speed up and down slowly at start-up and shutdown.

11. Filter according to claim 9, wherein the shafts and discs are arranged to provide an hydraulic coupling between the overlapping discs of adjacent shafts.

* * * * *